(12) United States Patent
Jurkovic

(10) Patent No.: US 10,605,441 B2
(45) Date of Patent: Mar. 31, 2020

(54) LUMINAIRE AIMING DEVICE AND METHOD

(71) Applicant: Eye Lighting International of North America, Inc., Mentor, OH (US)

(72) Inventor: Paul J. Jurkovic, Painesville, OH (US)

(73) Assignee: Eye Lighting International of North America, Inc., Mentor, OH (US)

(*) Notice: Subject to any disclaimer, the term of this patent is extended or adjusted under 35 U.S.C. 154(b) by 0 days.

(21) Appl. No.: 16/056,517

(22) Filed: Aug. 6, 2018

(65) Prior Publication Data

US 2019/0041042 A1    Feb. 7, 2019

Related U.S. Application Data

(60) Provisional application No. 62/541,510, filed on Aug. 4, 2017.

(51) Int. Cl.
| | |
|---|---|
| *F21V 21/14* | (2006.01) |
| *H05B 33/08* | (2020.01) |
| *G01S 17/06* | (2006.01) |
| *F21Y 115/10* | (2016.01) |
| *F21W 131/105* | (2006.01) |

(52) U.S. Cl.
CPC ............. *F21V 21/14* (2013.01); *G01S 17/06* (2013.01); *H05B 33/0872* (2013.01); *F21W 2131/105* (2013.01); *F21Y 2115/10* (2016.08); *H05B 33/0803* (2013.01)

(58) Field of Classification Search
CPC . H05B 33/0872; H05B 33/0803; F21V 21/14; G01S 17/06; F21Y 2115/10; F21W 2131/105
See application file for complete search history.

(56) References Cited

U.S. PATENT DOCUMENTS

| | | | | |
|---|---|---|---|---|
| 4,410,933 A | * | 10/1983 | Blake ..................... | F16M 11/10 248/282.1 |
| 4,423,471 A | * | 12/1983 | Gordin .................... | F21V 15/04 362/218 |
| 5,647,661 A | * | 7/1997 | Gordin ..................... | F21S 8/08 362/283 |
| 2010/0128483 A1 | * | 5/2010 | Reo ......................... | F21S 8/038 362/294 |
| 2014/0334149 A1 | * | 11/2014 | Nolan ..................... | F21V 5/007 362/235 |

* cited by examiner

*Primary Examiner* — Kevin Quarterman
(74) *Attorney, Agent, or Firm* — Tucker Ellis LLP; Heather M. Barnes

(57) ABSTRACT

An aiming device configured for easily removable attachment to a light projecting luminaire. The device has a body with attachment members that are configured to fit a specific luminaire that has corresponding attachment receiving features, and is further configured with clamps for mounting a light source outputting a high intensity collimated visible light aiming beam such that, when the device is removably attached to the luminaire (i.e., latched in place) the laser is prepositioned to direct the laser beam parallel to a center axis of the luminaire's light output beam. Ideally the luminaire has preexisting features that can be utilized as the attachment receiving features for corresponding attachment members of a suitably configured aiming device.

1 Claim, 13 Drawing Sheets

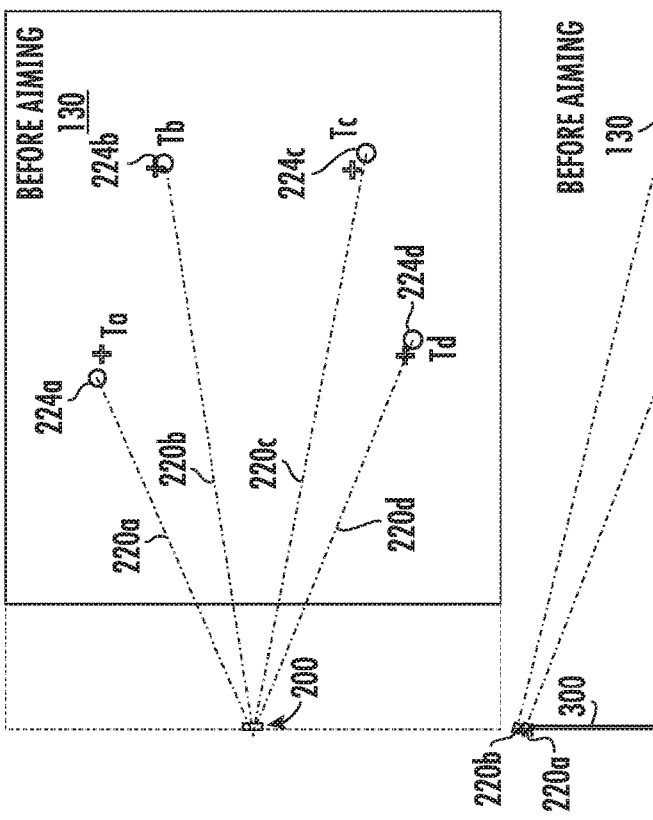
FIG. 18B
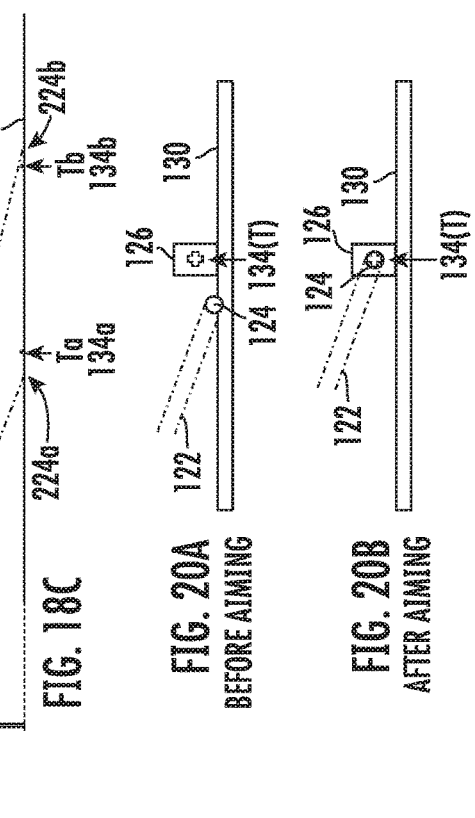
FIG. 18C
FIG. 20A
BEFORE AIMING
FIG. 20B
AFTER AIMING
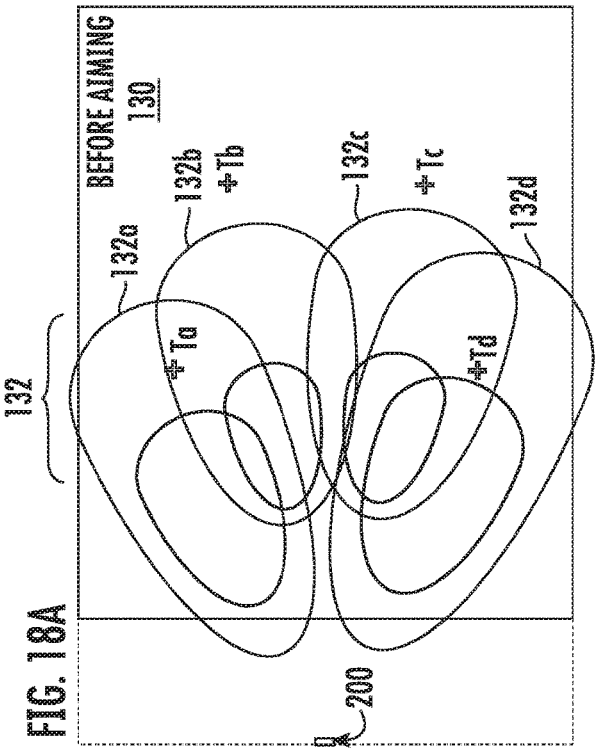
FIG. 18A
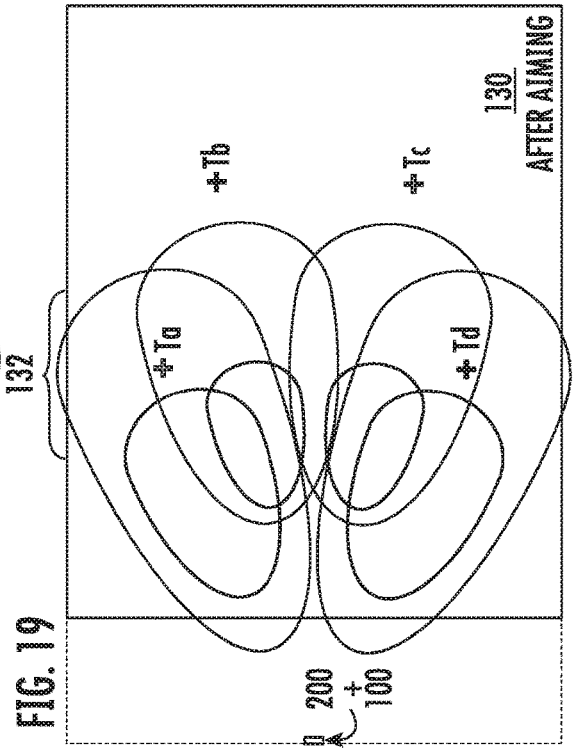
FIG. 19

LUMINAIRE AIMING DEVICE AND METHOD

CROSS-REFERENCE TO RELATED APPLICATIONS

This application claims the benefit of US Provisional Patent Application No. 62/541,510, filed Aug. 4, 2017, said application hereby incorporated in its entirety by reference herein.

TECHNICAL FIELD OF THE INVENTION

The present invention relates to large area lighting and, more particularly to aiming a projected lighting beam to a specific area or portion of the large area.

BACKGROUND OF THE INVENTION

FIGS. 1A-2B illustrate a problem to be solved by the device and method(s) disclosed herein. These exemplify fields 130 (e.g., sports fields) where a specific lighting (illuminance L) pattern is desired, e.g., uniform over large areas, and optionally extra brightness such as on bases and pitcher's mound. The "field" may also be a building, billboard, or wall. To illuminate such large areas, many projected light luminaires 200 (commonly referenced as floodlights or spotlights) must be aimed at predetermined portions of the field to produce overlapping light distribution patterns. Multi tier high mast (pole, post) 300 luminaire mounting platforms 302 are typically used, as in the examples shown. Although a lighting pattern on the field (illuminance distribution 132) can be calculated and a beam endpoint 224 determined for where the center line of each luminaire's projected "beam" (beam axis 220) hits the field surface, the actual aiming is very difficult for a variety of reasons (further explained below): The beam endpoint is generally not at the center of the brightest portion of a single luminaire's lighting pattern; the center of the lighting pattern may not be visually obvious, and even the outer boundary of the pattern is difficult to discern because it is typically diffused over a range of lower light levels rather than having sharply defined cutoff edges. Furthermore, each point of the pattern on the field is the sum of all luminaire's overlapping patterns. Thus visual aiming is very inaccurate. Even if computer generated adjustment angle settings are used, due to long distance throws (e.g., 300-500'), difficult-to-measure variations in high mast (e.g., 80-100') verticality, and lamp output variations from theoretical, even careful adjustment to the calculated elevation and azimuth aiming angles ($\alpha$, $\varphi$) only produces a first approximation that may be off by at least 20 feet.

In the past, lighting uniformity problems due to aiming errors were typically compensated by using an excess of luminaires with very wide beam patterns and redundant overlapping, plus lighting levels high enough to provide adequate light in the darkest areas at the expense of over-lighting other areas. This is very energy-inefficient with much wasted energy. These methods were also supported by the nature of previous large area lighting luminaires. For example, HID light sources in the luminaires, particularly higher output sources, are elongated (e.g., 6 by 1 inch or larger arctube) making it impossible to optically direct a high percentage of the light output into a narrow beam that concentrates light into a relatively small area at long projecting distances. The "spill light", "up-light", glare etc. all contribute to wasted energy not being used to provide light where it is wanted.

To address inefficiency, LED lighting luminaires 200 have been developed such as the example illustrated by FIGS. 3A-5B with output specifications such as those shown in FIGS. 6A-7C. Such luminaires achieve high energy efficiency in several ways. First of all, LED light sources 202 are very high efficiency. Importantly, they can be configured as point sources in reflectors that concentrate light in a relatively small field area even at great distances (avoiding wasted spill light, up light, etc.). Their concentrated lighting pattern is quite uniform over a large portion of the beam pattern, and falls off fairly rapidly around the edges. This enables use of fewer luminaires to achieve overall lighting uniformity by essentially tiling the individual beam patterns rather than relying on the redundancy of many overlapping individual patterns with wide fringe areas of gradually decreasing brightness.

The problem now raised is that much more precise aiming of each luminaire is necessary to ensure adequately uniform illuminance on the field. This requires fine tuning of the luminaire aiming angles ($\alpha$, $\varphi$) by a person on the high mast 300.

The current practice for luminaire aiming is to install the luminaires 200 on the pole mounting platform 302 and first adjust to the computer calculated aim settings by rotating the azimuth angle adjustment member 208 to the calculated azimuth angle $\gamma$ before tightening the luminaire mounting bolt(s), and by rotating the elevation angle adjustment member 210 to the calculated elevation angle $\alpha$ and tightening its locking clamp. Fine tuning to a more precise aim typically takes 2-3 days because the resulting light distribution patterns 132 must be evaluated at night in order to see them, but it is too dangerous for personnel to go up and work on the high mast platform 302 at night. Thus adjustments must be determined at night, then implemented during daylight, however the results cannot be determined until the next night. This is further complicated because moving one luminaire 200 will change the appearance of overlapping areas all around it. This trial and error process is very expensive, and made worse if more precision is desired. If time is cut by settling on approximate aiming, there may be unacceptable non-uniformities (hot spots and dim spots).

Therefor it is an object of this invention to provide a projected light luminaire aiming device and method that overcome the limitations of the prior art to make it faster and easier to achieve optimum illumination patterns by accurate aiming.

BRIEF SUMMARY OF THE INVENTION

According to the invention an aiming device is configured for easily removable attachment to a light projecting luminaire. The device has a body with attachment members that are configured to fit a specific luminaire that has corresponding attachment receiving features, and is further configured with clamps for mounting a light source outputting a high intensity collimated visible light aiming beam such that, when the device is removably attached to the luminaire (i.e., latched in place) the laser is prepositioned to direct the laser beam parallel to a center axis of the luminaire's light output beam. Ideally the luminaire has preexisting features that can be utilized as the attachment receiving features for corresponding attachment members of a suitably configured aiming device.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different versions of an element 109 which are similar or related in some way but are separately referenced for the purpose of describing modifications to the parent element (109). Such relationships, if any, between similar elements in the same or different figures will become apparent throughout the specification, including, if applicable, in the claims and abstract.

Figure 1A:
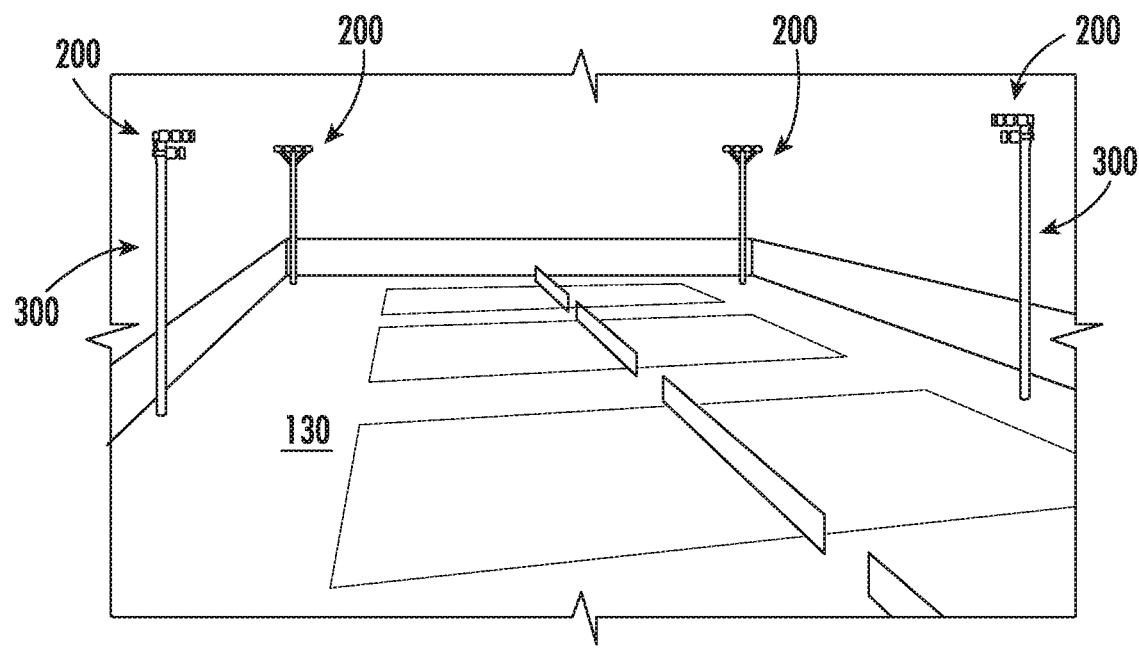
Figure 2A:
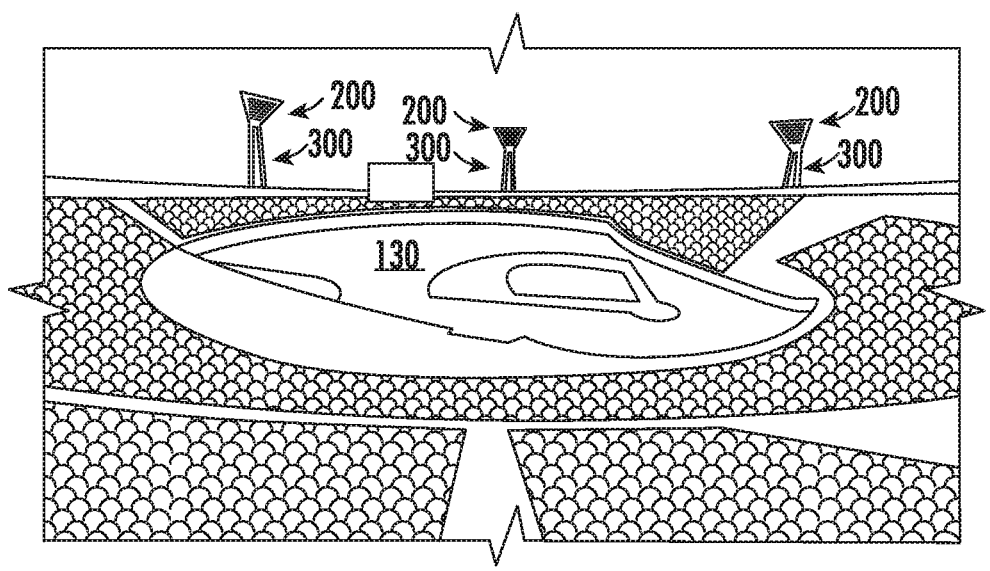

The structure, operation, and advantages of the present preferred embodiment of the invention will become further apparent upon consideration of the following description taken in conjunction with the accompanying drawings, wherein:

FIGS. 1A and 2A are perspective views of example large area fields being lighted by projected light luminaires.

Figure 1B:
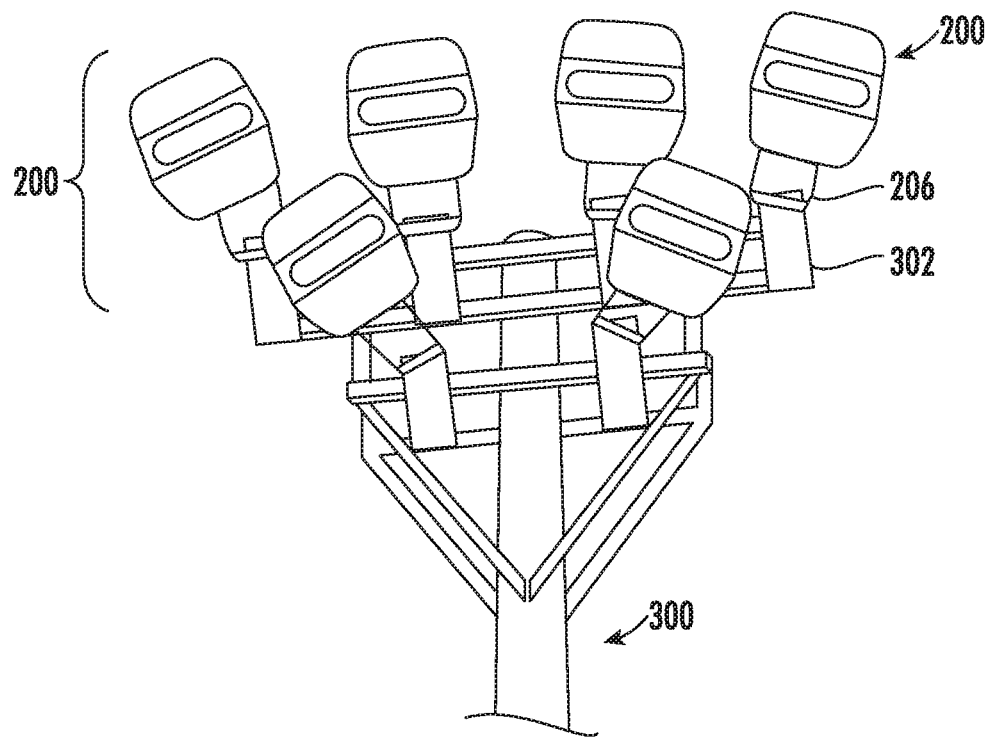
Figure 2B:
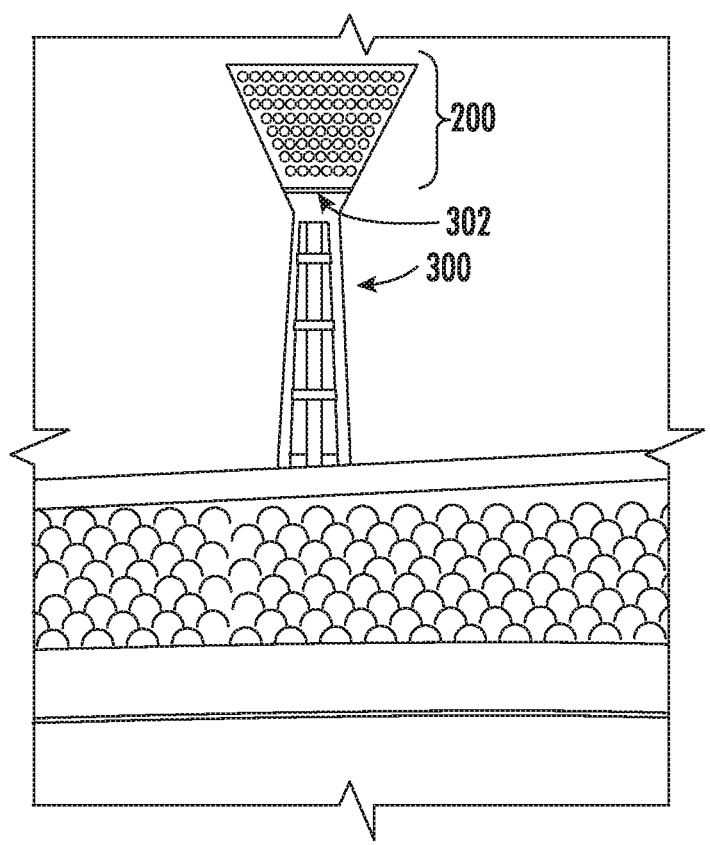

FIGS. 1B and 2B are magnified views of the projected light luminaires being used to light the respective fields of FIGS. 1A and 2A.

Figure 3A:
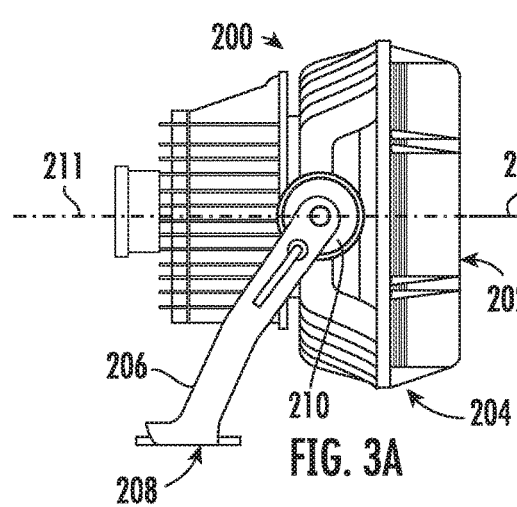
Figure 3B:
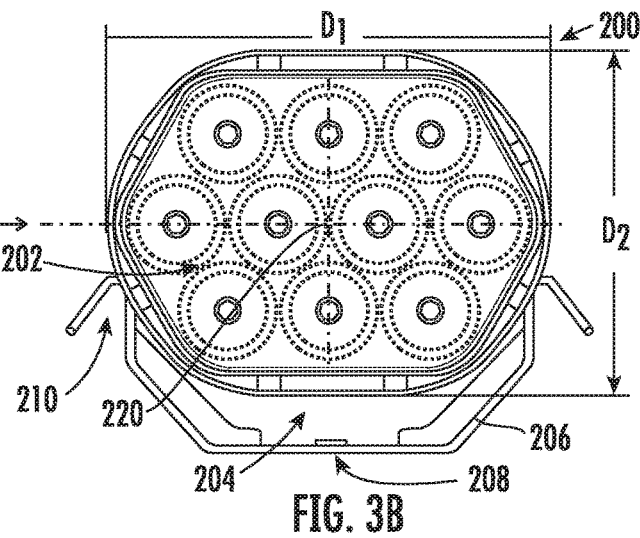

FIGS. 3A-3B are side and front views, respectively, of an example projected light luminaire suitable for use with the invention.

Figure 3C:
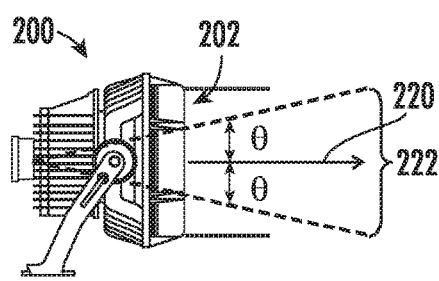

FIG. 3C is a side view of a luminaire showing aspects of a projected light beam, according to the invention.

Figure 4:
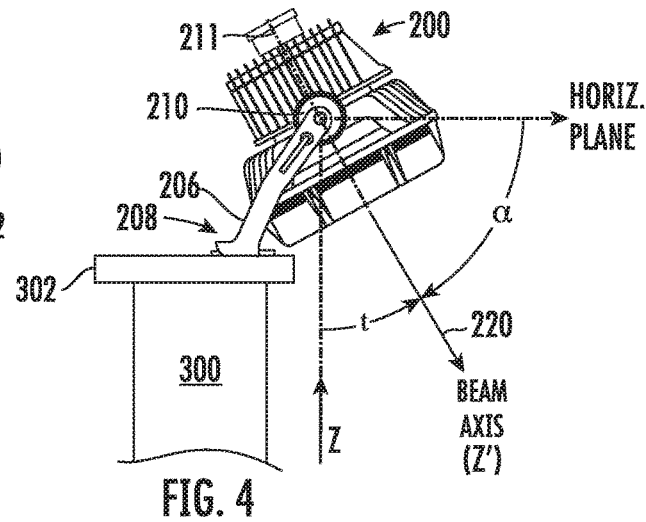

FIG. 4 is a side view of a luminaire showing an elevation angle adjustment member in use, according to the invention.

Figure 5A:
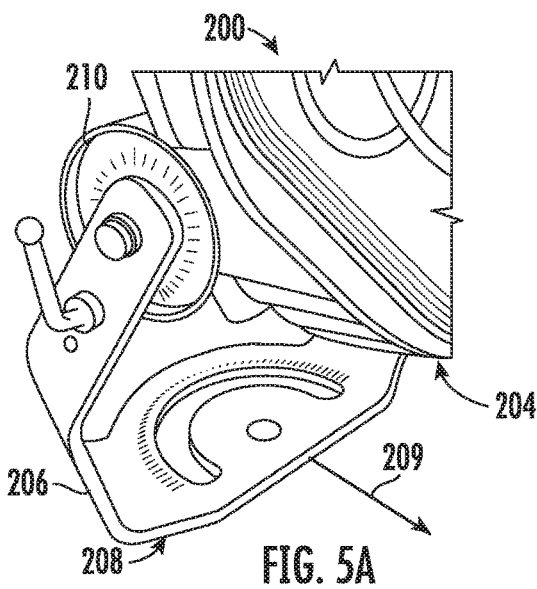
Figure 5B:
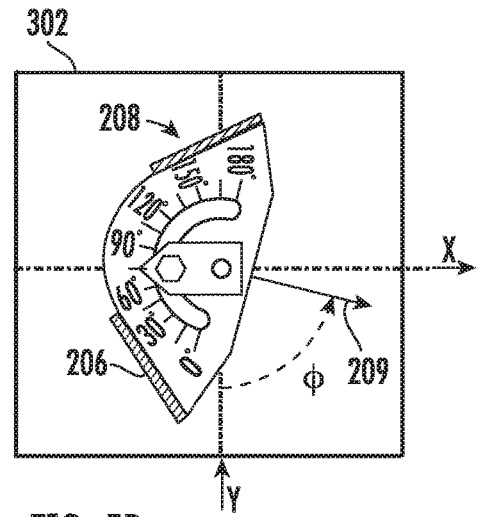

FIGS. 5A-5B are perspective and plan views, respectively, of an azimuth angle adjustment member of a luminaire, according to the invention.

Figures 6A, 6B, 6C:
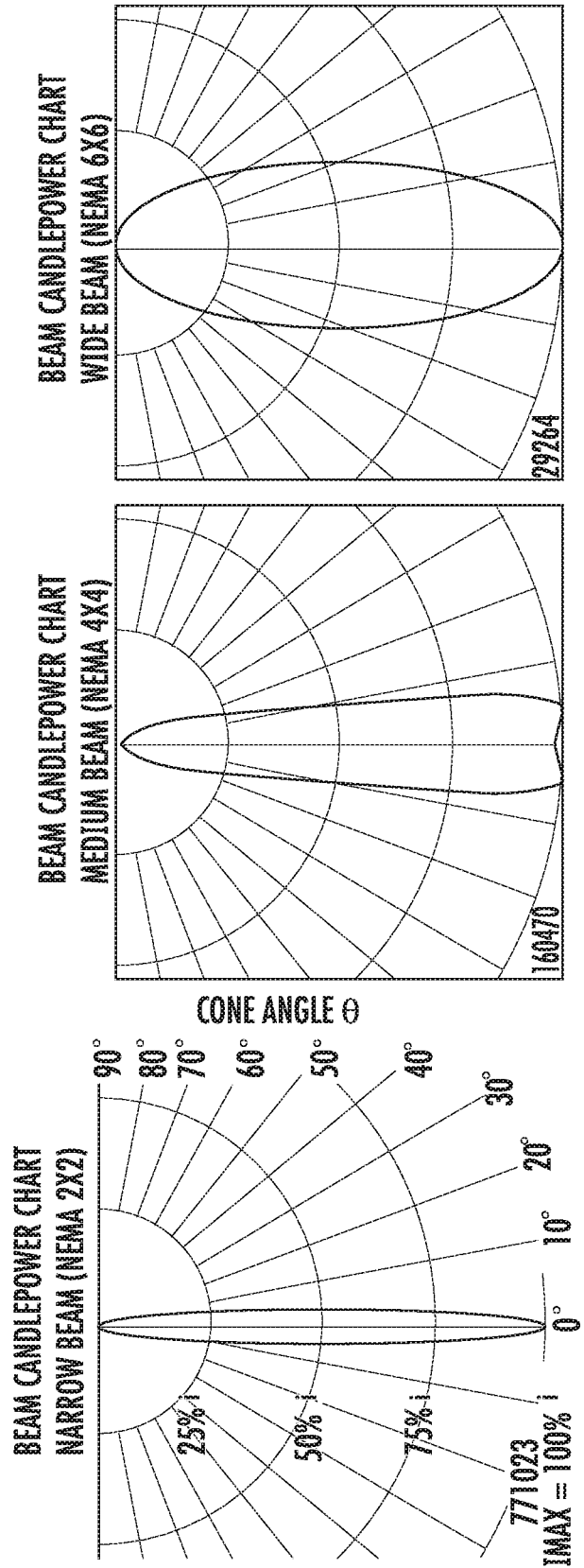

FIGS. 6A-6C are beam candlepower (intensity) charts of output specifications for narrow, medium, and wide beam versions of an example projected light luminaire suitable for use with the invention.

Figure 7C:
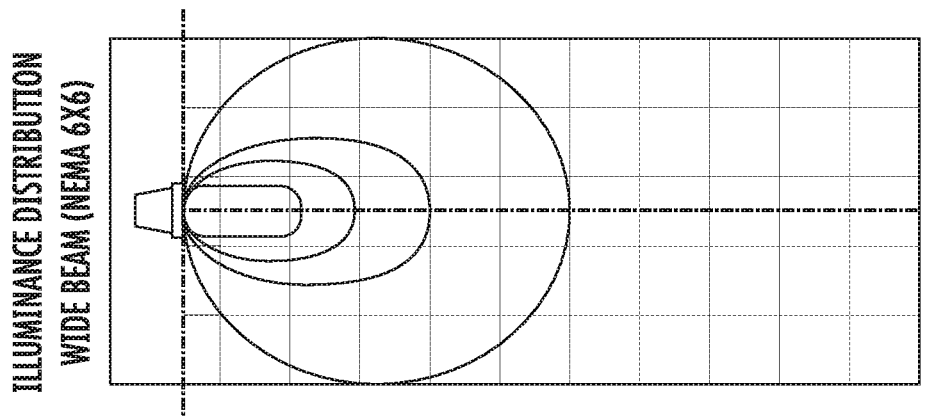
Figure 7B:
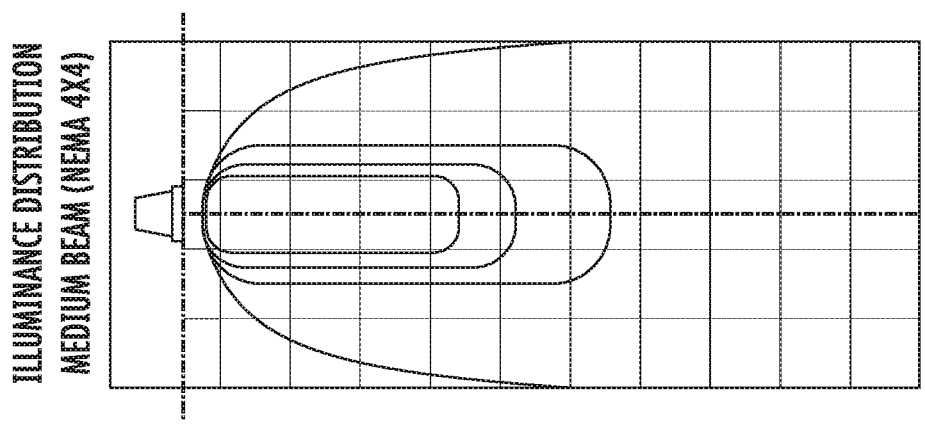
Figure 7A:
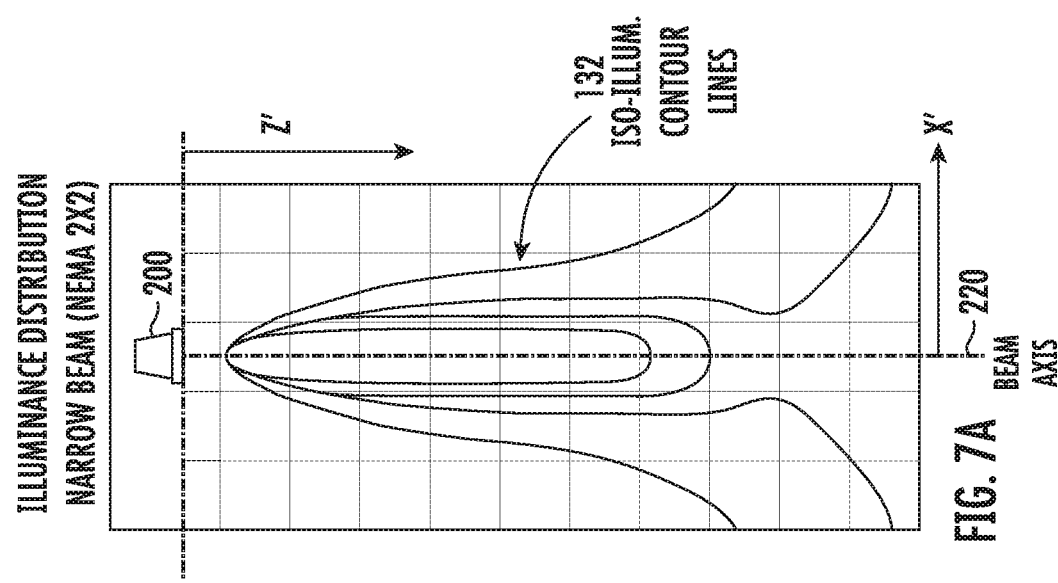

FIGS. 7A-7C are illuminance distribution charts of output specifications for narrow, medium, and wide beam versions of an example projected light luminaire suitable for use with the invention.

Figure 8A:
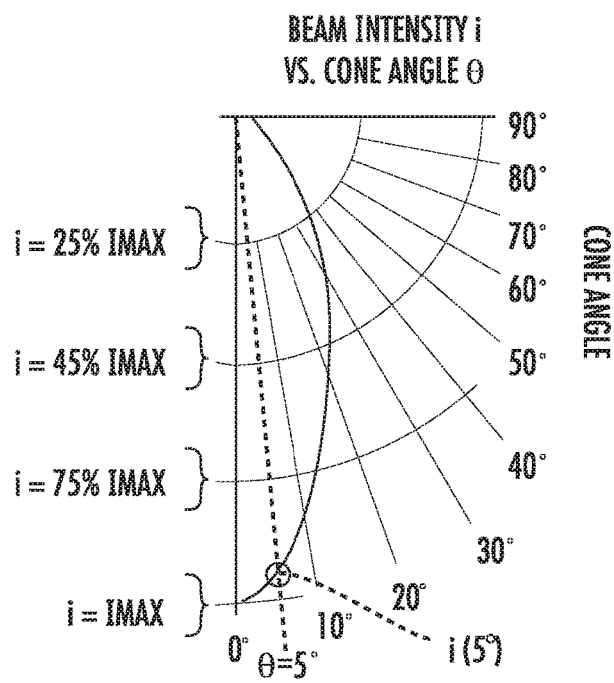
Figure 8B:
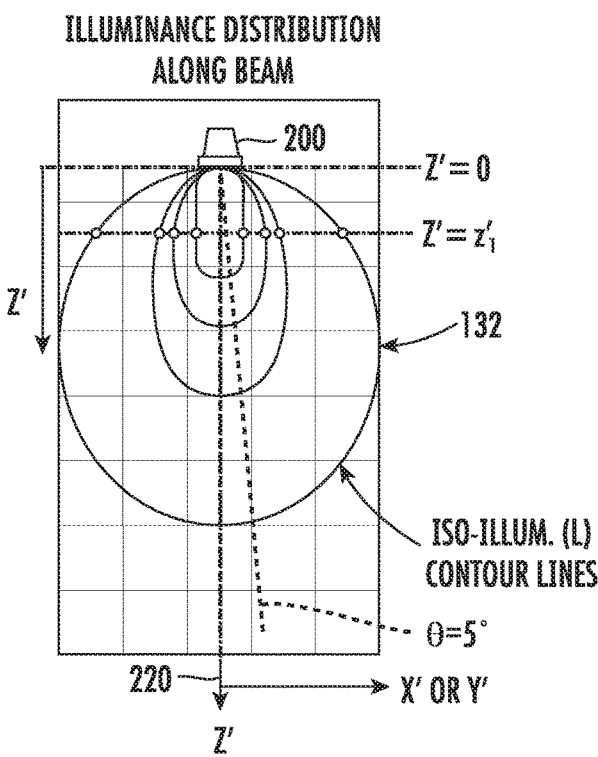
Figure 8C:
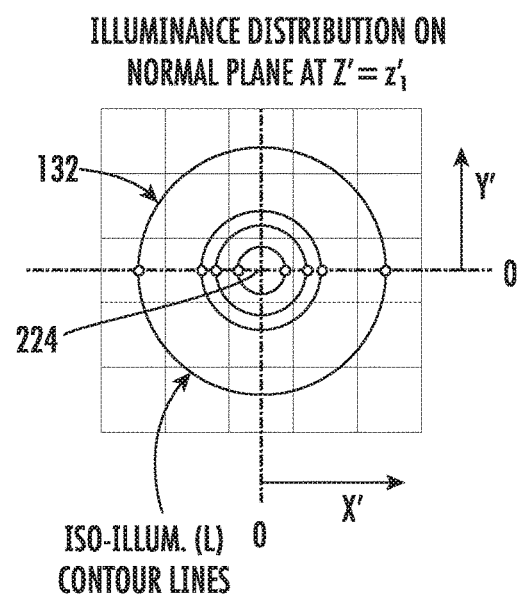

FIGS. 8A-8C show an intensity chart and corresponding illuminance distribution along an example light beam, plus a resulting illuminance distribution on a plane normal to the beam axis at the labeled axial distance.

Figure 9B:
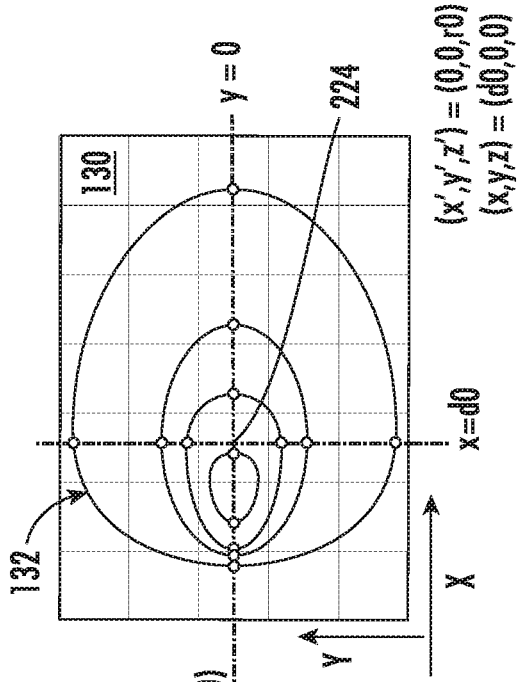
Figure 9A:
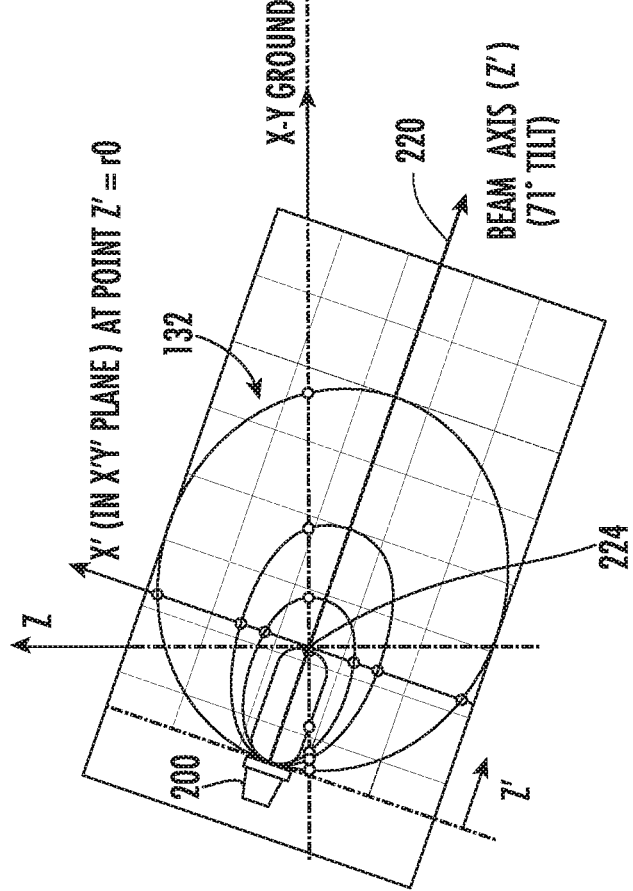

FIGS. 9A-9B show the illuminance distribution along the example light beam of FIGS. 8A-8B, plus a resulting illuminance distribution on a ground plane at the labeled axial distance when the beam axis is tilted.

Figure 10A:
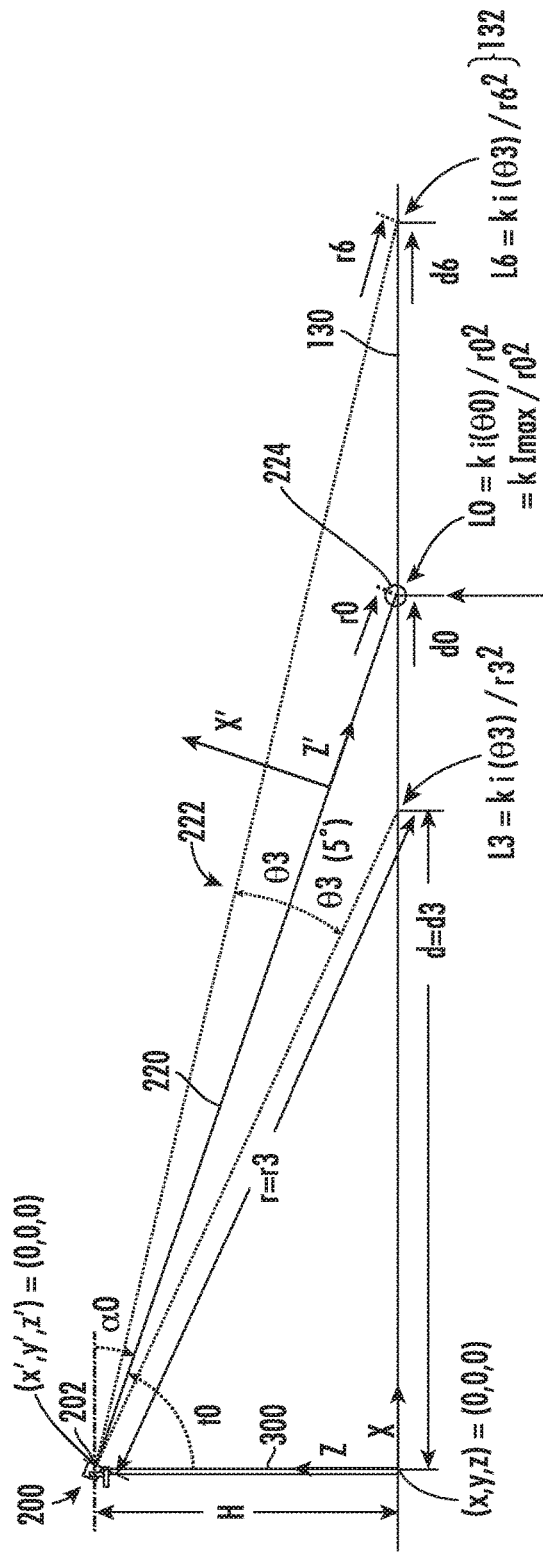
Figure 10B:
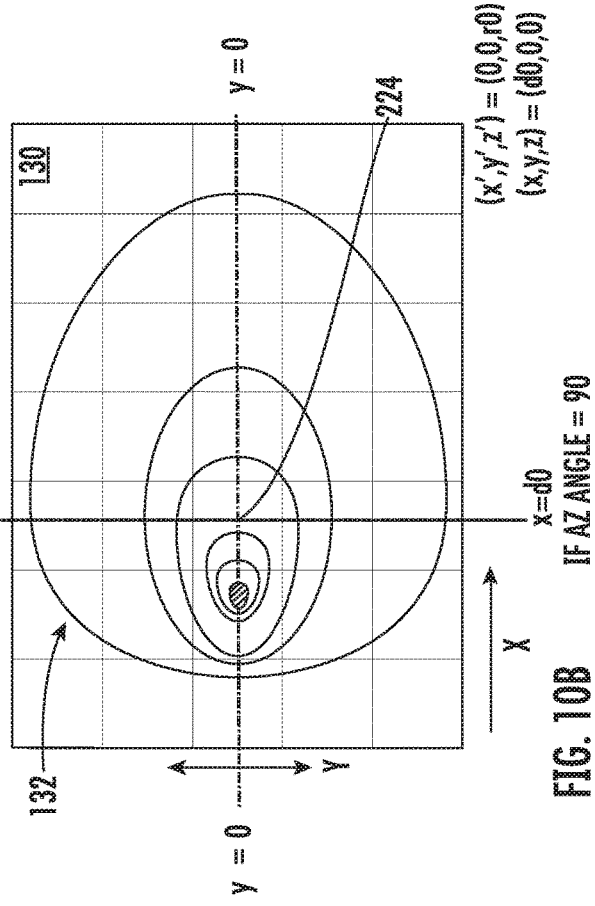

FIGS. 10A-10B show the ground plane illuminance distribution of FIG. 9B correlated with a schematic side elevation view of the luminaire aimed at the ground plane field.

Figure 11A:
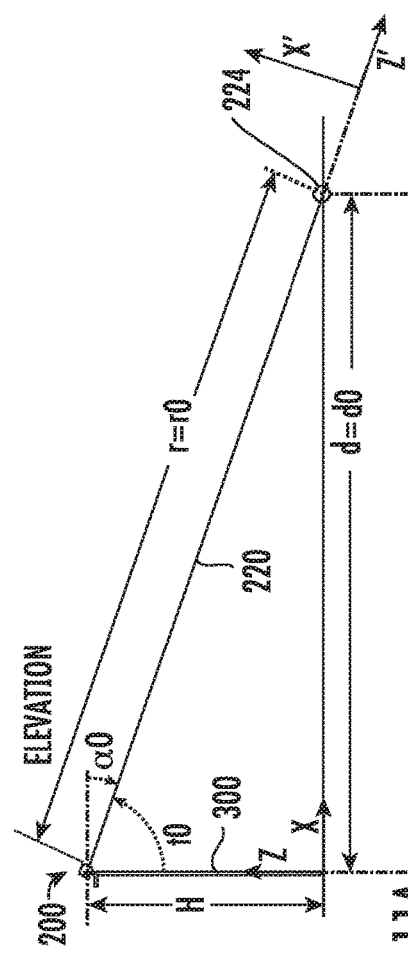
Figure 11B:
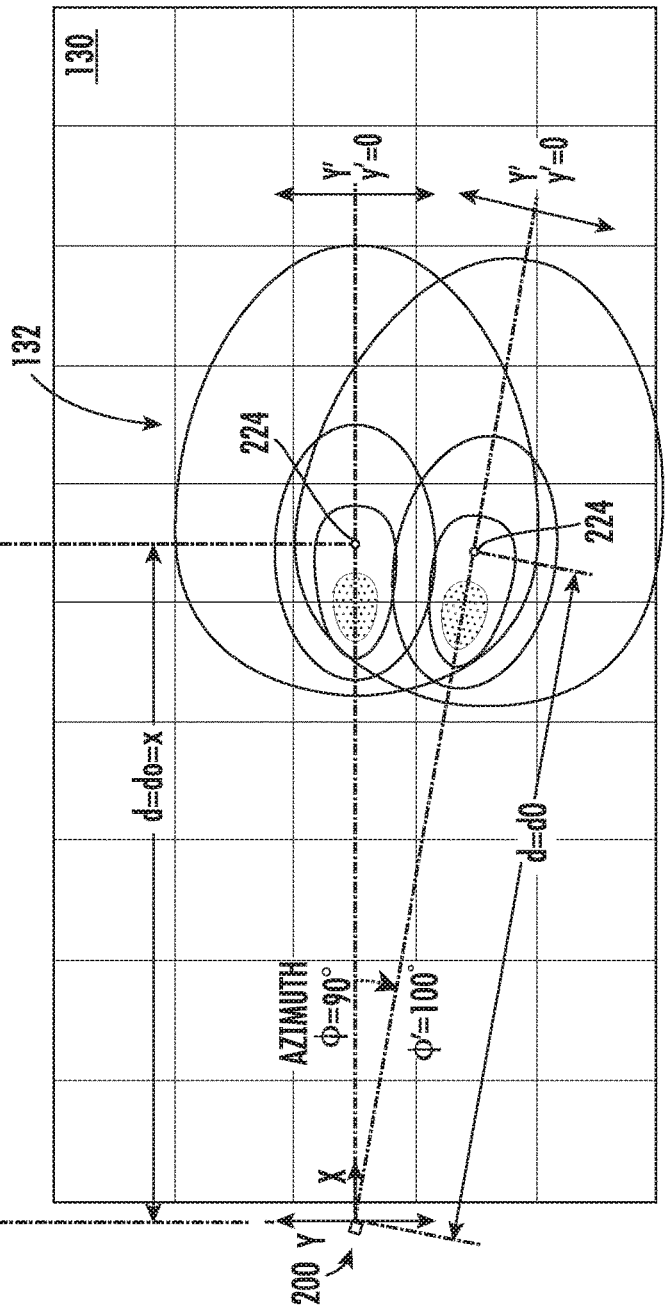

FIGS. 11A-11B show the ground plane illuminance distribution and correlated schematic side elevation view as in FIGS. 10A-10B, modified to show the effect of changing azimuth angle.

Figure 12:
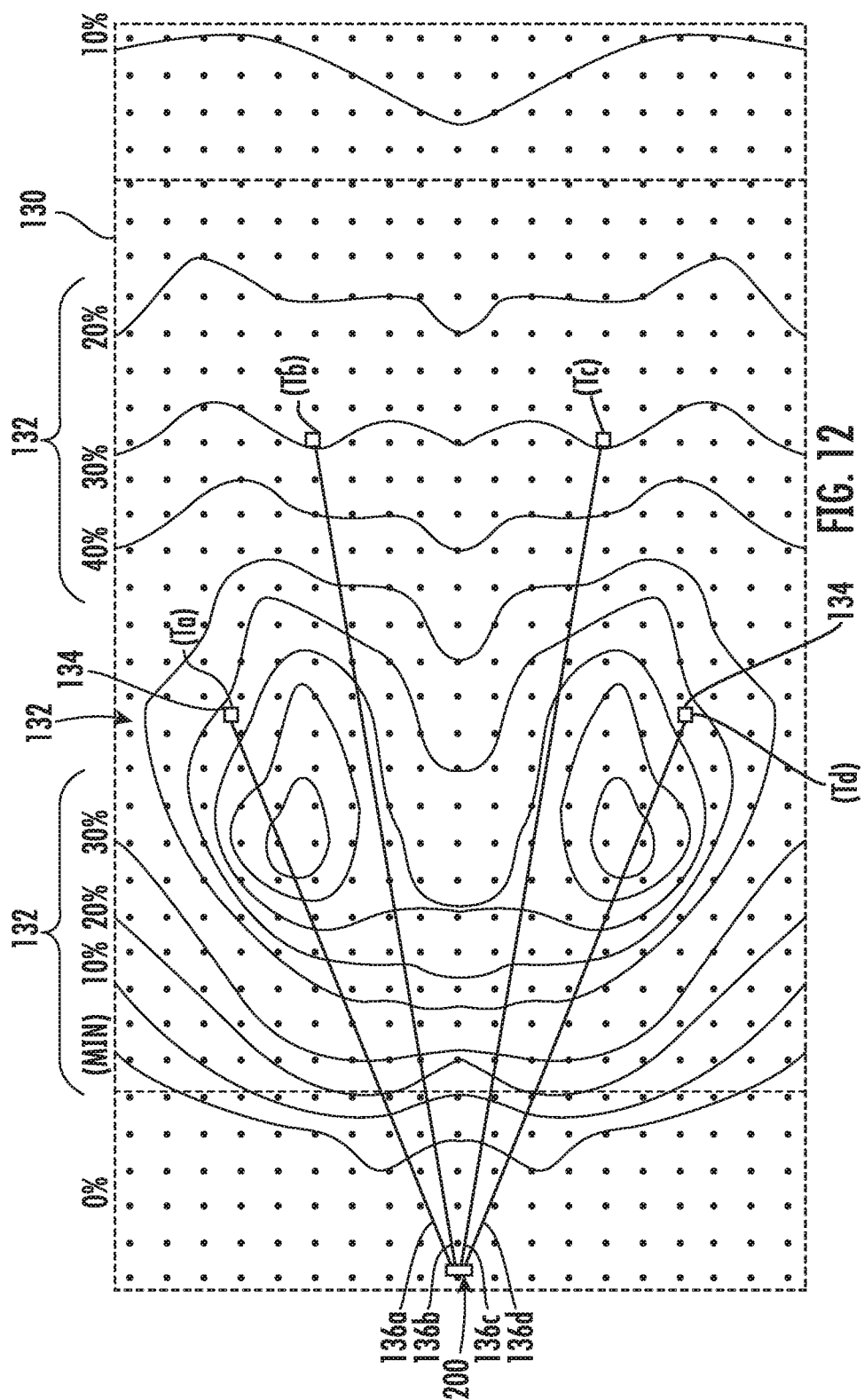

FIG. 12 shows a plan view of a field and calculated iso-illuminance contour lines resulting from four luminaires if accurately aimed at four target points labeled Ta-Td.

Figure 13:
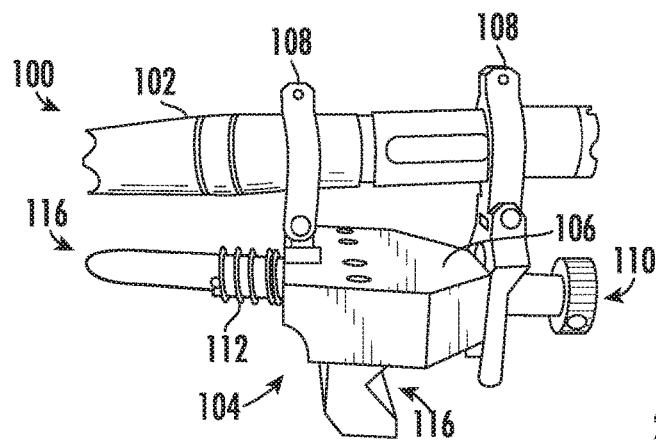

FIG. 13 shows a perspective view of a luminaire aiming device according to the invention.

Figure 14A:
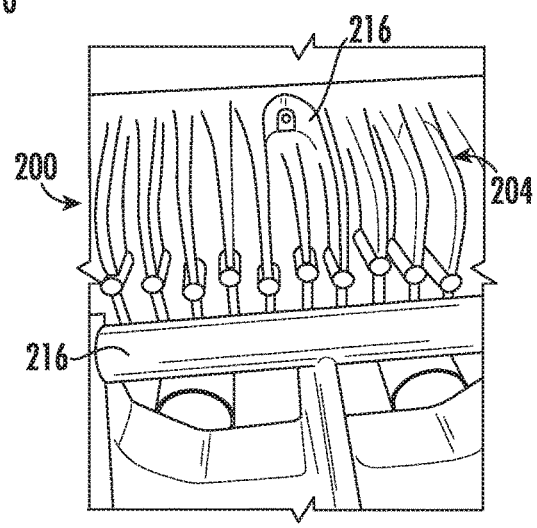

FIG. 14A shows a partial perspective view of a luminaire having features suitable for use by the luminaire aiming device according to the invention.

Figure 14B:
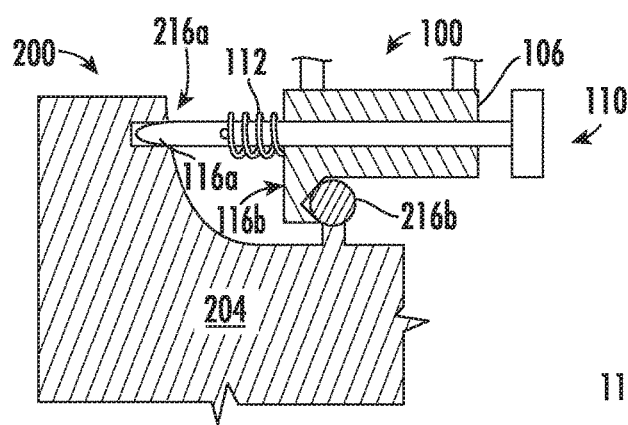

FIG. 14B is a sectional view of the luminaire aiming device removably attached to a luminaire according to the invention.

Figure 15A:
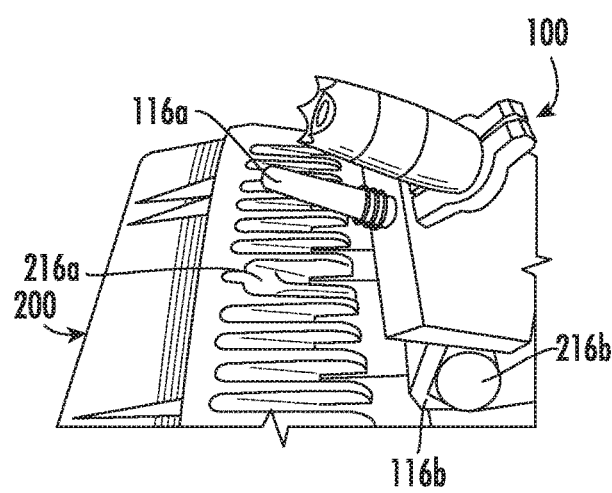
Figure 15B:
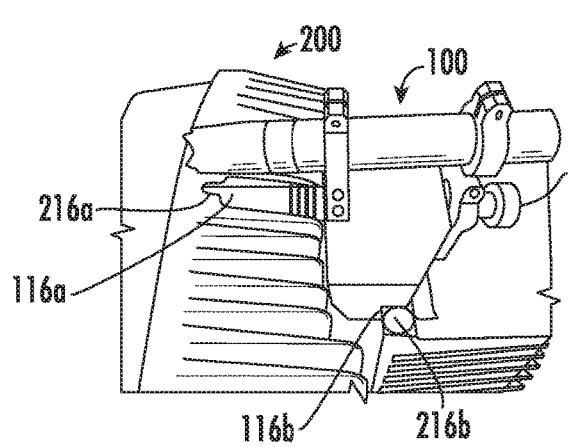

FIGS. 15A-15B are partial perspective views of the luminaire aiming device removable attachment process according to the invention.

Figure 16A:
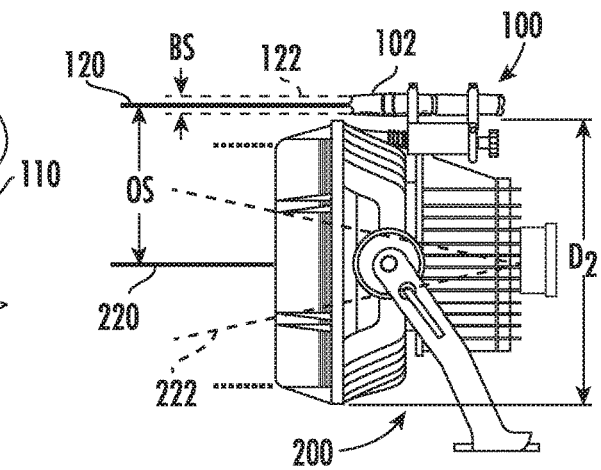
Figure 16B:
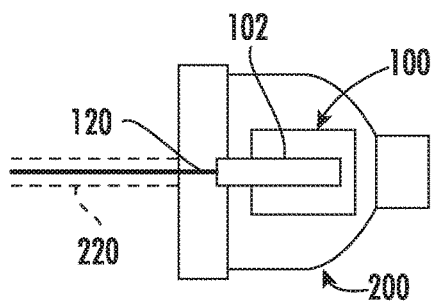

FIGS. 16A-16B are side and plan views, respectively, of the attached luminaire aiming device output beam orientation and position relative to the luminaire projected light beam axis, according to the invention.

Figure 17:
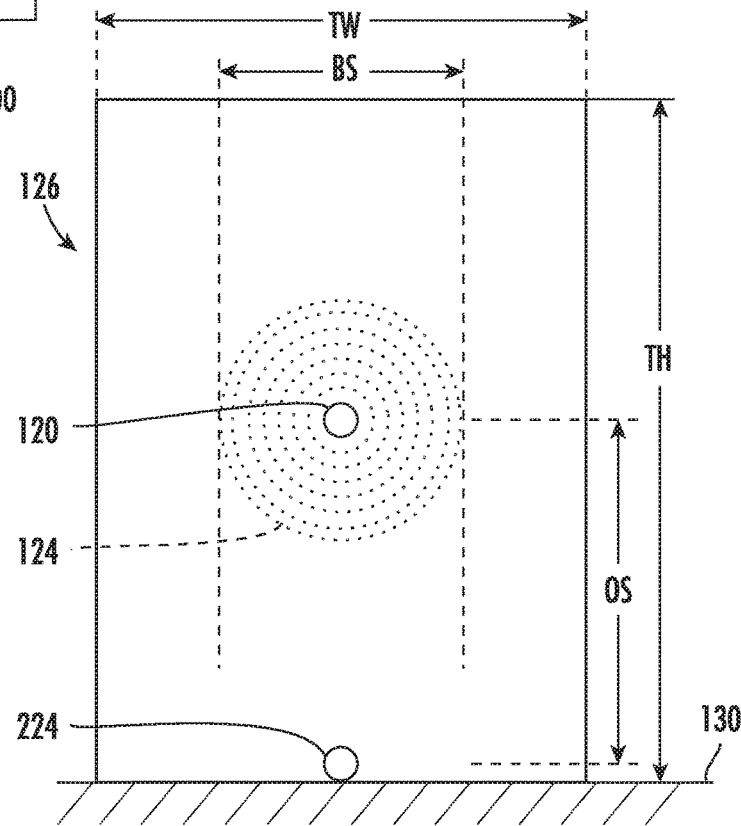

FIG. 17 is a side view of an example aiming target, according to the invention.

FIGS. 18A-18B are plan views of a field showing four luminaire specific illuminance patterns in 18A and corresponding theoretical beam axes and endpoints in 18B, all resulting from four luminaires that are mis-aimed before aiming at four respective target points marked by crosses.

FIG. 18C is a side schematic view of FIG. 18B.

FIG. 19 is a plan view of a field showing four luminaire specific illuminance patterns resulting from four luminaires after they have been aimed.

FIGS. 20A-20B are side views of an aiming beam and target, showing them respectively before and after aiming by the device and according to the method of the invention.

DETAILED DESCRIPTION OF THE INVENTION

The following table is a glossary of terms and definitions, particularly listing drawing reference numbers or symbols and associated names of elements, features and aspects of the invention(s) disclosed herein.

REF.=TERMS AND DEFINITIONS

100 Luminaire Aiming Device, Laser Aiming Device, "LAD", alignment device
102 aiming beam emitter, preferably a laser
104 mounting structure, body
106 platform/base of structure
108 laser mounting arms and clamps, may be adjustable
110 releasable latch, quick release, latching member
112 spring to bias the latch in attached position
116 attachment members configured to fit corresponding attachment receiving features 216 in a specific luminaire. May be plurality of members a, b . . . for features a, b . . .
120 laser/aiming beam axis (path)

122 aiming/alignment beam, e.g., collimated beam of (preferably visible) light projected from a laser. This is extremely narrow, for example: having a beam spread BS of about 6 inches at 500 feet or more distance. Thus the aiming beam illuminance is not significantly reduced by distances within a thousand feet. Used to aim the luminaire by creating a visible aiming spot 124 close to the luminaire beam endpoint 224.

124 aiming spot illuminated on the field where the aiming (laser) beam hits the field (close enough to be equivalent to luminaire beam end point 224).

126 Aiming target object. A diffusely reflective object for positioning at an aiming target point 134 to provide a visual indication of laser/aiming spot 124 position relative to the aiming target point 134. A white painted board on a vertical stand is example. A good aim indicator was found to be a white plastic 5 gallon pail. Target aiming point may be painted on the indicator, or the aim point may be the visual approximate center of the target's width TW and/or height TH.

130 Field/area to be lighted, typically a generally horizontal surface designated as the X-Y plane in world coordinates.

132 Illuminance distribution pattern of values (L) measured or theoretically calculated for a grid of points in the field. The resulting distribution pattern may be graphically shown using iso-illuminance contour lines. This pattern a.k.a. "beam pattern" or "light distribution".

134 aiming target point (T). Calculated location in the field where the (theoretical) beam endpoint 224 should hit if the luminaire is accurately aimed. Defined by a calculated (X,Y) coordinate, which is preferably correlated to a calculated aim setting ($\alpha$, $\varphi$, H) for a luminaire.

136 Aimed beam axis. Theoretical path to target from an accurately aimed luminaire.

200 Luminaire

202 Projected light source in the luminaire, e.g., LEDs in reflectors. A reference plane normal to the projected beam axis may be specified as the origin (start of beam) for beam cone angle and beam distance calculations (e.g., plane at front face of luminaire).

204 Luminaire body

206 Yoke supporting member, used to mount luminaire on platform of supporting structure 208 Azimuth angle $\varphi$ adjustment member, with numbered scale.

209 Azimuth angle director (arrow indicating direction forward from yoke set by 208 adjustment). Azimuth angle $\varphi$ is measured relative to Y axis in the horizontal plane.

210 Elevation (tilt) angle adjustment member, with numbered scale.

211 Elevation (tilt) angle director (line parallel to beam axis 220 indicating direction set by 210 adjustment). Elevation angle $\alpha$ is measured relative to X-Y horizontal plane.

216 LAD attachment receiving features, preferably pre-existing aspects of luminaire design that are identified as being suitable for use in attaching the LAD. May be plurality of features a, b . . .

220 Beam axis, centerline, perpendicular to center of light source reference plane. Defines zero degree cone angle in beam intensity (candlepower) charts. The imaginary point where the beam axis intersects the ground level (X-Y plane) determines the beam endpoint 224.

222 The "beam" of projected light—roughly cone-shaped with intensity varying from a maximum near the axis and decreasing for increasing cone angles as specified in a "Beam Candlepower (Intensity) Chart 224 Beam endpoint, the spot where beam axis 220 intersects the ground level (X-Y plane). Approximated as being equal to laser beam aiming spot 124.

300 supporting structure for luminaire(s), e.g., pole or high mast 302 mounting platform of 300

X,Y,Z Orthogonal axes in world coordinates, X-Y plane is parallel to (average) ground plane, normal to vertical direction of Z axis.

X',Y',Z' Orthogonal axes relative to beam axis which determines the Z' axis and X'-Y' plane is normal to the beam axis.

$\alpha$=elevation angle, measured relative to horizontal plane (X-Y)=zero degrees elevation.

t=tilt angle=90-$\alpha$ degrees, where straight down in vertical direction (Z)=zero degrees tilt.

$\varphi$=azimuth angle

H=height (Z dimension) of the luminaire above the field 130

$\theta$=beam cone angle measured from beam axis. The angle determines the beam intensity as shown in the beam intensity (e.g., candlepower) chart specified for a specific luminaire/light source design.

i=projected light intensity at a point in the light beam. It is constant for any distance along a given cone angle ($\theta$) line, but illuminance (L) decreases with the square of distance (r) along that line.

r=beam distance from source to a measurement point (e.g., on the ground) in the light beam.

d=beam distance projected onto the X-Y ground plane, thereby varying with the sine of the tilt angle modified by the cone angle L=illuminance (Fc)=k $i/r^2$ where k is a proportionality constant. This equation shows how illuminance (e.g., in footcandles Fc) at any point on a surface located a distance r from a light source of intensity i is proportional to the intensity (which does not change with distance), but inversely proportional to the distance squared.

i=intensity (Cd) varies with cone angle $\theta$ as shown by the beam candlepower chart BS=Beam Spread of aiming/alignment beam (laser)

OS=Offset distance between parallel aiming and luminaire beam axes (120, 220)

D1=width of luminaire body

D2=height of luminaire body

T=target point/location (134) for target 126 on the field 130

TW=target width

TH=target height

The invention(s) will now be described with reference to the drawings using the reference numbers and symbols listed in the above table.

FIG. 12 illustrates the desired illuminance distribution 132 for an example application of the inventive device and method. The job requirements were to use luminaires on one edge of a 200 foot wide field 130 that extended more than 300 feet out, and to achieve illuminance levels between 0.2 Fc (footcandles) minimum to 4.3 Fc maximum in a key zone between 50 and 300 feet out. Maximum energy efficiency was also wanted, so LED lighting luminaires 200 such as the example illustrated by FIGS. 3A-5B with output specifications such as those shown in FIGS. 6A-7C, were used. As explained in the background section above, this meant that fewer luminaires could be used to achieve overall lighting uniformity by essentially tiling the individual beam patterns rather than relying on the redundancy of many overlapping individual patterns with wide fringe areas of gradually decreasing brightness. This example was inspiration for the invention because achievement of the desired distribution required much more precise aiming of each luminaire to ensure adequately uniform illuminance within the specified range of values.

The requirements were met by the FIG. 12 illuminance pattern which was computer calculated for points every 10 feet in the field (points indicated by the grid of dots), using four luminaires 200 aimed at the target points labeled Ta-Td. The luminaires are mounted on an 80 foot high mast 300 at the center of the edge as shown. Each luminaire 200 effectively lights a 100'×150' area including overlapping fringe areas. The brightest central areas (on each side) may be about 30'×40' surrounded by about 50'×80' area where brightness gradually decreases from 85% to 70% of maximum, after which the brightness decreases to 50% at about 60'×100' area edges. However, there are no rapid changes that would indicate obvious boundaries, especially because the eye's response is logarithmic. Furthermore, these areas are too large for the observer to make accurate brightness comparisons among parts that can't be seen in the same view. As a result, visual observation can only lead to a "guesstimate" that places the beam endpoint 224 an uncertain distance and direction beyond the brightest area.

As shown by FIGS. 9A-10B, because the field is lighted from the side, the luminaire 200 is projecting a somewhat conical beam at a low angle (e.g., 19 degrees as shown in the side view of FIG. 10A) across a horizontal surface, therefor the lighting pattern is greatly distorted and brightest in an area well ahead of where the theoretical beam center intersects the ground.

It should be noted that the illustrated beam pattern 132 graphed as iso-illuminance contour lines is representative of the results of precisely located accurate measurements followed by drawing lines on paper to connect selected values. A human eye cannot discern specific lighting levels in a gradually changing gradient, therefor the beam pattern lines are all but invisible—only gross changes in illuminance are apparent, and the location of that change only roughly approximated.

Thus, precise positioning is very hard to achieve using existing methods. For example, FIGS. 10A-10B show the ground plane (field) 130 illuminance distribution of FIG. 9B correlated with a schematic side elevation view of the luminaire 200 aimed toward the field at a 71 degree tilt angle t0. The computer calculated theoretical beam axis 220 hitting the ground at a theoretical beam end point 224, and the illuminance distribution pattern 132 with selected iso-illuminance contour lines around them are graphically represented, but even if the field 130 were to be marked with a target aiming point for the beam end point 224, there is no practical way to aim the luminaire 200 at the spot because the beam end point 224 is not visually apparent to any degree of accuracy, especially for a tilted beam like this where the brightest "hot spot" (shown shaded) is well ahead of the beam end point 224.

In another example, FIGS. 18A and 19 show before-aiming, and after-aiming plots of four overlapping luminaire-specific illuminance patterns 132a-132d relative to respective target aiming points Ta-Td. Even on paper it is very difficult to determine the effect of aiming. Referring to FIG. 12, which shows the overall distribution 132 resulting from adding together the four overlapping patterns of FIG. 19 (after aiming) it can also be seen how difficult it is to determine or predict the light pattern effects from changes to the aim of any of the luminaires 200. For example the hot spot ahead of target point Ta is distorted and extended outward by the luminaire aimed at Tb, but the relationship between the aiming of the two luminaires is almost impossible to discern.

Adding to the difficulty of visual aiming (i.e., aligning to a theoretical location point) is that the luminaires are large and irregularly shaped (e.g., D1=19.8" and D2=15.6" in FIG. 3B).

FIGS. 8A-8C show how the beam endpoint 224 is fairly apparent for floodlights aimed at a perpendicular surface, and this is still approximately applicable for large projection angles, such as for luminaires mounted extremely high above a relatively small field. But FIGS. 9A-10B show what happens when the luminaires are at much smaller angles of elevation.

Referring now to FIGS. 13-17, a luminaire aiming device 100 ("LAD") and method for its use are disclosed, for easily and quickly removable attachment to a light projecting luminaire 200, to enable quick and accurate luminaire aiming in daylight conditions. The LAD 100 may alternatively be referenced as an alignment device because aiming a luminaire involves directing its projected light beam 222 to a particular portion of the lighted field 130 by aligning the axis (centerline) 220 of the beam 222 with an aimed beam axis 136, which is a theoretical path from a properly aimed luminaire to a calculated target aiming point 134, e.g., the point marked with 'T' on a diagram of the field 130 such as shown by FIG. 12.

For use in aiming luminaires, our prototype testing luminaire 200 is a particularly suitable, but non-limiting example wherein the aiming device 100 is physically mounted on an LED projected light (e.g., floodlight) luminaire 200 with lumen output over 20,000 lm, for example as shown in FIGS. 3A-7C.

The aiming device 100 has a mounting structure (body) 104 with clamp(s) 108 or the like for mounting an aiming beam emitter 102, preferably a "laser" or the like as detailed hereinbelow. The aiming device 100 mounting structure 104 is further configured with attachment members 116 that are configured (customized) to fit corresponding attachment receiving features 216 in a specific luminaire 200 (i.e., a particular design, type or embodiment of the luminaire 200). There may be a plurality of attachment members (e.g., 116a, 116b) for corresponding attachment receiving features (e.g., 216a, 216b respectively). The attachment members 116 are configured such that when the device 100 is attached to the luminaire 200 (e.g., as shown in FIGS. 16A-16B), the aiming beam emitter 102 is latched 110 into a repeatable fixed location and orientation relative to the light beam axis 220, which is determined by the luminaire construction.

In particular, the aiming beam emitter (e.g., laser) 102 is positioned/oriented to direct the aiming beam 122 such that its axis 120 is parallel to the center axis 220 of the luminaire's light output beam 222. It may be noted that the beam axes 120, 220 are spaced apart (see FIG. 16A) by an offset distance OS, but the offset OS is small enough to have a negligible and indiscernible effect on illuminance (lighting) pattern 132 when aiming/aligning a beam producing a pattern 132 that covers a large area (e.g., 30 to 50 or more feet in any direction from beam center, while the offset OS is only about 8 inches for the example luminaire 200 that has a body height D2 of about 16 inches).

The aiming beam emitter 102 projects a narrow beam 122 (beam spread BS) of light sufficient to visibly illuminate an aiming spot 124 in a concentrated area on the field 130 negligibly close to where the luminaire beam end point 224 is to be located (see FIG. 17). A minimum brightness (illuminance) for the aiming spot 124 is sufficient to be seen in sunlight by a person on the ground who could radio movement instructions to an adjuster located at the luminaire 200 on the pole 300. Preferably a reflection of the spot is visible to the adjuster on the pole 300 to provide immediate feedback directly to the adjuster while adjustments are being made (trial and error fine tuning with no lag time). Particularly for large area lighting as described herein, the large distances involved make a "laser" (i.e., collimated light source) the most practical choice for use as the aiming beam emitter 102. Our preferred embodiment is a commercially available battery powered laser that is a high intensity, narrow beam (beam spread BS less than 1 degree), small numerical aperture optical emitting device. As an example of a suitable laser 102, the laser used in the prototype testing was a 1-watt green laser capable of producing a spot visible up to about 1,000 feet. Advantageously it is battery powered.

Referring to FIGS. 17-20B, a laser 102 was found and tested to show feasibility. It produced excellent results 132 under severe test conditions, wherein a luminaire 200 on an 80 foot high pole 300 located 200 or 300 feet from a target point 134 was aimed to within 1 foot of the target point in about 30 seconds (starting from aiming adjustment angles initially set according to computer calculated theoretical values). As shown by FIG. 17, the laser produced a 6" wide spot reflected off of a diffuse white target 126 such that it was visible to the adjuster on the pole 300 in bright sunlight conditions in Nevada.

Regarding a suitable target 126, it is diffusely reflective, preferably white for good contrast with the green laser beam, and has a larger reflecting area than the aiming beam. For example, the target may be a white painted board laid on the ground or held upright in some fashion. The target point 134 may be marked on the target 126 (e.g., a cross as in FIGS. 20A-20B), or as shown in FIG. 17 the target width TW and height TH may be close enough to the aiming beam diameter BS to allow estimation by aiming for the approximate center of the target 126, for example target dimensions TW and TH approximately twice the aiming beam diameter BS. In prototype tests, a common white plastic 5 gallon bucket/pail made a convenient target 126. Example dimensions are about 15" high (TH) by 10 to 11 inches diameter (TW).

FIGS. 14A-15B particularly illustrate the attachment members 116 of the LAD 100 and corresponding receiving features 216 of the luminaire 200. Preferably the receiving features 216 are already present in a standard version of a particular luminaire 200 embodiment, and the attachment members 116 are created and/or adjusted to make a corresponding version (embodiment) of the aiming device 100 that is customized for use with that luminaire 200 embodiment (and maybe other similar embodiments having the same or similar receiving features). Less preferably, luminaires may be customized to provide receiving features 216 that will work for attachment members 116 on an existing embodiment of the LAD 100 (e.g., a universal, adjustable version).

In either situation the attachment receiving features 216 are immovable elements of the luminaire body 204 (e.g., the housing) such that they are positioned in a fixed location and orientation relative to the beam center 220, and this relative position is substantially the same on all luminaires of a particular design. Preferably the relative position is maintained on more than one design, such that a particular LAD custom design could be used without modification on a larger group of luminaires. Furthermore, the attachment receiving features 216 are shaped and positioned such that attachment members 116 can be removably attached and latched in a stable fixed position, i.e., triangulated contact that prevents all movement of the attached device 100 relative to the luminaire 200 (e.g., pitch, yaw, roll, wiggle, rocking, translation, etc.).

The illustrated example is for a customized LAD embodiment that utilizes standard existing features 216 of a luminaire 200. In this example a horizontal bar 216b spaced apart from a recess 216a were selected for use because they enable removable attachment with latching, and triangulated contact for fixed positioning of the laser beam. In the illustrated prototype, the bar is a handle and the recess is a "docking recess". The customized LAD 100 is made removable and latching by providing a spring 112 biased sliding bolt type of quick-release latch 110 with a pin 116a on one side pressing against an opposite facing groove 116b. The pin and groove attachment members 116 provide triangulated fixed positioning when latched, by the following method: the pin member 116a and/or the receiving hole/recess 216a is tapered to be self centering and wedges together; and the groove member 116b is perpendicular to the pin 116a and V shaped to self-align with at least two points of contact on the bar 216b, held by the spring 112 biasing the pin away from the groove. As shown, the pin 116a may slidingly pass through a hole to end at a knob 110 for pulling the pin against the spring bias and out of the recess 216a such that the device 100 is easily attached and latched in position for aiming use, and then removed for re-use on another luminaire. No tools required.

Referring to FIGS. 12-20B, and particularly to FIGS. 17 and 20A-20B, the inventive aiming method is disclosed as follows:

The luminaire aiming device 100 may be used in an aiming method including the steps of:

Calculating target points 134 being theoretical locations of beam axis end points 224 according to a predetermined illuminance distribution pattern 132 calculated to produce a desired (e.g., uniform) illumination pattern on a field 130 to be lighted by at least one luminaire 200 mounted on at least one pole 300.

Assigning a luminaire 200 to each target point

Aiming the luminaire 200 assigned to the target point by the following process:

Preferably determining initial luminaire aiming angles (elevation and azimuth) and using as a starting point that will theoretically position the aiming beam spot within a more easily observable proximity to the target.

Placing a diffusely reflective target at a target point

Attaching an aiming device 100 locked into a fixed position relative to a light beam direction that is set by the luminaire construction, wherein the mounted device has a light source outputting a high intensity collimated visible light aiming beam directed parallel to the center axis of the luminaire's light output beam.

Observing the aiming beam spot position in the field while adjusting the luminaire aiming angles to re-position the aiming beam spot until it overlaps the target point indicated by the reflective target, then locking the luminaire 200 in the aimed orientation.

Removing the aiming device 100 from the aligned luminaire, and

Repeating the process for additional target points and assigned luminaires.

SUMMARY

The invention comprises an aiming device 100 configured for easily removable attachment to a light projecting luminaire. The device has a body with attachment members that are configured to fit a specific luminaire 200 that has corresponding attachment receiving features, and is further configured with clamps for mounting a light source outputting a high intensity collimated visible light aiming beam such that, when the device is removably attached to the luminaire 200 (i.e., latched in place) the laser is prepositioned to direct the laser beam parallel to a center axis of the luminaire's light output beam.

Ideally the luminaire 200 has preexisting features that can be utilized as the attachment receiving features for corresponding attachment members of a suitably configured aiming device.

Although the invention has been illustrated and described in detail in the drawings and foregoing description, the same is to be considered as illustrative and not restrictive in character—it being understood that the embodiments shown and described have been selected as representative examples including presently preferred embodiments plus others indicative of the nature of changes and modifications that come within the spirit of the invention(s) being disclosed and within the scope of invention(s) as claimed in this and any other applications that incorporate relevant portions of the present disclosure for support of those claims. Undoubtedly, other "variations" based on the teachings set forth herein will occur to one having ordinary skill in the art to which the present invention most nearly pertains, and such variations are intended to be within the scope of the present disclosure and of any claims to invention supported by said disclosure.

What is claimed is:

1. A luminaire aiming device for aiming a projected lighting beam to a specific area or portion of a large field, the device comprising:

an aiming beam emitter with small numerical aperture and beam spread less than about one degree;

a mounting structure with a clamp for mounting the aiming beam emitter;

attachment members that are configured to fit corresponding attachment receiving features in a luminaire to be aimed, wherein the attachment members make triangulated contact with the attachment receiving features; and a latching member with a spring to bias the latch into engagement of the attachment members with the attachment receiving features; and the device is configured such that when the attachment members are engaged with the attachment receiving features, the aiming beam emitter is positioned and oriented to direct the aiming beam such that its axis is parallel to a center axis of the luminaire's projected light beam.

* * * * *